US007394564B2

(12) United States Patent
Kiyohara

(10) Patent No.: US 7,394,564 B2
(45) Date of Patent: Jul. 1, 2008

(54) PRINTING MACHINE WITH A CONTROL UNIT THAT DISPLAYS A PLURALITY OF KEY OPERATION SWITCHES TO CONTROL INK KEYS

(75) Inventor: Satoru Kiyohara, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 960 days.

(21) Appl. No.: 10/602,062

(22) Filed: Jun. 24, 2003

(65) Prior Publication Data

US 2004/0000241 A1 Jan. 1, 2004

(30) Foreign Application Priority Data

Jul. 1, 2002 (JP) ............................ 2002-191598

(51) Int. Cl.

*B41F 31/05* (2006.01)
*B41F 31/00* (2006.01)
*H04N 1/60* (2006.01)
*H04N 1/62* (2006.01)
*H04N 1/00* (2006.01)
*B41F 30/02* (2006.01)
*B41F 30/04* (2006.01)

(52) U.S. Cl. .......................... 358/1.9; 358/1.8; 358/502; 358/3.29; 101/135; 101/365; 101/335; 347/6

(58) Field of Classification Search .................. 358/1.4, 358/502, 1.8, 1.18, 3.29, 1.9; 347/6; 101/365, 101/135, 171, 335
See application file for complete search history.

(56) References Cited

U.S. PATENT DOCUMENTS 3,958,509 A * 5/1976 Murray et al. ........... 101/350.1
4,008,664 A * 2/1977 Crum et al. ................. 101/365
4,513,377 A 4/1985 Hasebe et al.
4,639,776 A * 1/1987 Foerster et al. ................ 348/61
4,977,831 A * 12/1990 Walter ........................ 101/365
4,977,832 A * 12/1990 Walter ........................ 101/365

(Continued)

FOREIGN PATENT DOCUMENTS

JP 58219062 A * 12/1983

(Continued)

OTHER PUBLICATIONS

Japanese Office Action issued in Japanese Patent Application No. JP 2002-191598, dated on Apr. 22, 2008.

*Primary Examiner*—Gabriel Garcia
*Assistant Examiner*—Chad Dickerson
(74) *Attorney, Agent, or Firm*—McDermott Will & Emery LLP

(57) ABSTRACT

In an initial state, a key control switch for adjusting opening degrees of ink keys and a display changeover switch are displayed on a display screen of a touch sensitive control panel. The key control switch is a collection of key control switches individually arranged in areas corresponding to the ink keys, and for each ink color. The individual key control switches indicate color densities of control strips on a print measured by a color density measuring device and the opening degrees of the ink keys. When the changeover switch is operated in this state, the control panel simultaneously displays the key control switches and an image of the print being processed.

4 Claims, 7 Drawing Sheets

U.S. PATENT DOCUMENTS

| | | | | |
|---|---|---|---|---|
| 5,029,527 | A * | 7/1991 | Jeschke et al. | 101/365 |
| 5,832,830 | A * | 11/1998 | Rancourt et al. | 101/365 |
| 6,378,429 | B1 * | 4/2002 | Tomita et al. | 101/365 |
| 6,427,591 | B1 * | 8/2002 | Schmid | 101/351.8 |
| 6,446,555 | B1 | 9/2002 | Schramm et al. | |
| 6,536,341 | B2 * | 3/2003 | Shiki et al. | 101/365 |
| 6,539,863 | B2 * | 4/2003 | Shiraishi | 101/365 |
| 6,601,512 | B2 * | 8/2003 | Yamamoto et al. | 101/484 |
| 6,814,002 | B2 * | 11/2004 | Orimoto | 101/335 |
| 6,999,200 | B2 * | 2/2006 | Shiraishi | 358/1.9 |
| 2001/0020427 | A1 * | 9/2001 | Shiraishi | 101/365 |
| 2001/0029864 | A1 | 10/2001 | Franke et al. | |
| 2002/0043166 | A1 * | 4/2002 | Okuda | 101/181 |
| 2002/0080407 | A1 * | 6/2002 | Hatayama et al. | 358/3.06 |
| 2003/0094108 | A1 * | 5/2003 | Shiki | 101/171 |
| 2007/0227378 | A1 * | 10/2007 | Nagai et al. | 101/365 |

FOREIGN PATENT DOCUMENTS

| | | | |
|---|---|---|---|
| JP | 6255086 | | 9/1994 |
| JP | 06255086 | A * | 9/1994 |
| JP | 11-235810 | | 8/1999 |
| JP | 2001-277477 | | 10/2001 |

* cited by examiner

PRINTING MACHINE WITH A CONTROL UNIT THAT DISPLAYS A PLURALITY OF KEY OPERATION SWITCHES TO CONTROL INK KEYS

BACKGROUND OF THE INVENTION

1. Field of the Invention

This invention relates to a printing machine for controlling an ink feeding rate by measuring the color density of prints produced.

2. Description of the Related Art

Such a printing machine includes ink feeders for adjusting the rates of feeding inks to ink rollers. Each ink feeder has a plurality of ink keys juxtaposed in a direction perpendicular to a printing direction (i.e. a direction for transporting printing paper at printing time). Each ink feeder adjusts the rate of feeding ink to the ink rollers by varying the opening degree of each ink key. In this way, the rate of feeding ink ultimately to a printing plate is adjusted. For manually adjusting the opening degree of each ink key, a construction is provided for operating key control switches displayed on a control panel and corresponding to the ink keys, respectively.

The ink keys, 10 to 20 in number, are arranged in the direction perpendicular to the printing direction. It is difficult to correlate the key control switches corresponding to these ink keys with an image actually being printed.

It is thus conceivable to use a control panel such as a touch panel (also called a touch sensitive screen) for displaying the key control switches as well as an image actually being printed. However, where the control panel has a limited display space (area), it is difficult to display simultaneously the key control switches and the image actually being printed.

SUMMARY OF THE INVENTION

The object of this invention, therefore, is to provide a printing machine for simultaneously displaying key control switches for adjusting the opening degrees of ink keys and an image actually being printed, thereby to facilitate a correlation between the key control switches and the image.

The above object is fulfilled, according to this invention, by a printing machine for controlling ink feeding rates by adjusting opening degrees of a plurality of ink keys arranged in a direction perpendicular to a printing direction, the printing machine comprising a touch sensitive control panel for adjusting the opening degrees of the ink keys, and a device for displaying, in superimposition on the control panel, key control switches for adjusting the opening degrees of the ink keys and an image of the print being processed.

This printing machine displays the key control switches and an image of the print in superimposition. This is effective to avoid the above-noted difficulty in correlating the key control switches corresponding to the ink keys with the image being printed.

In a preferred embodiment of the invention, the key control switches are displayed as superimposed on the image of the print being processed, by transmitting the key control switches through the image of the print.

In another aspect of the invention, a printing machine is provided for controlling ink feeding rates by adjusting opening degrees of a plurality of ink keys arranged in a direction perpendicular to a printing direction, based on color density of a print measured by a color density measuring device, the printing machine comprising a touch sensitive control panel for adjusting the opening degrees of the ink keys, an image memory for storing an image of the print being processed, and a control unit for displaying, in superimposition on the control panel, key control switches for adjusting the opening degrees of the ink keys, the color density of the print measured by the color density measuring device, and an image of the print being processed.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
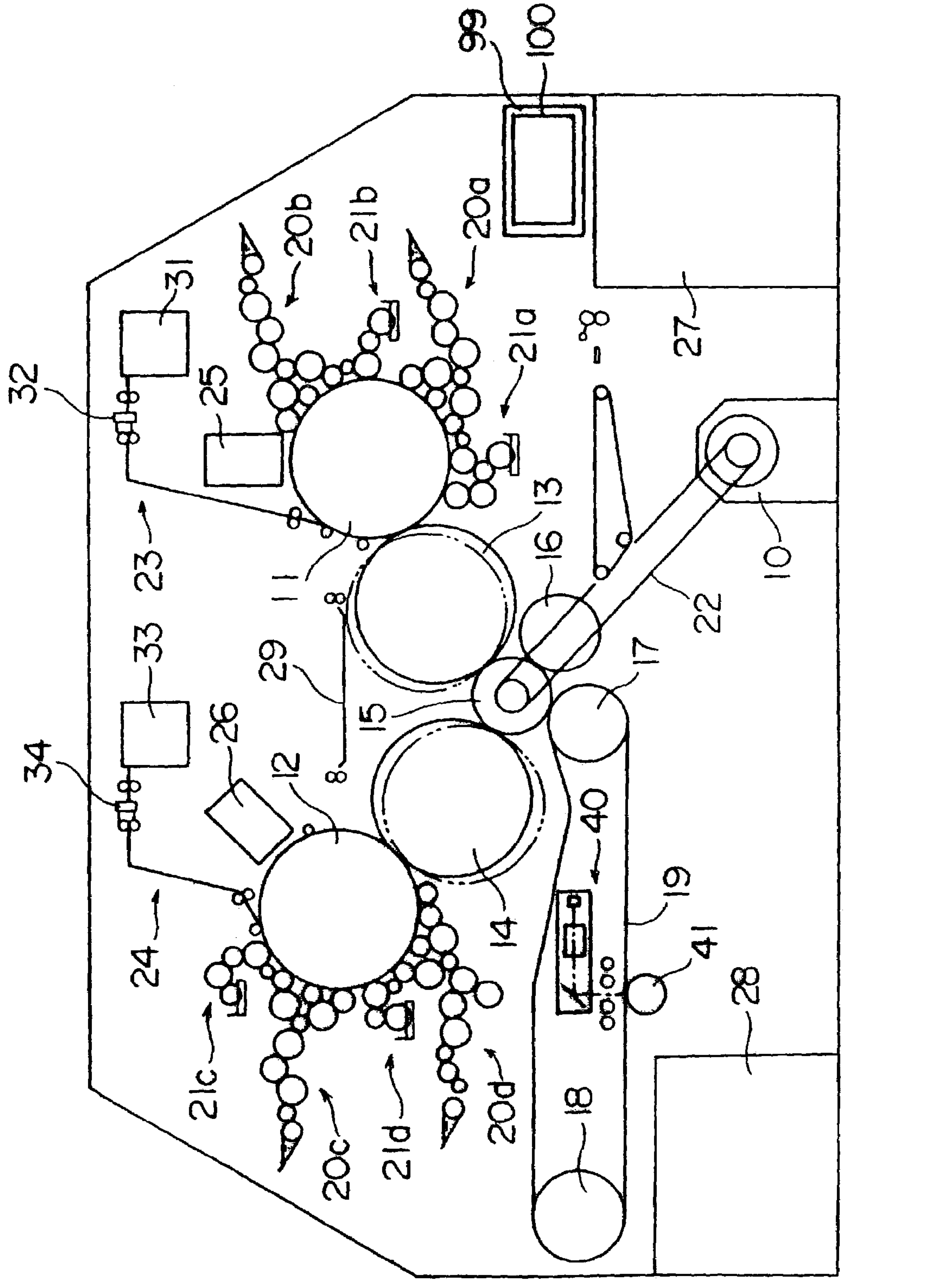
FIG. 1 is a schematic side view of a printing machine according to this invention.

An embodiment of this invention will be described hereinafter with reference to the drawings. FIG. 1 is a schematic side view of a printing machine according to the invention.

This printing machine makes printing plates by recording and developing images on blank plates mounted on first and second plate cylinders 11 and 12, feeds inks to the plates having the images recorded thereon, and transfers the inks from the plates through first and second blanket cylinders 13 and 14 to printing paper mounted on an impression cylinder 15, thereby printing the images on the printing paper.

The first blanket cylinder 13 is contactable with the first plate cylinder 11, while the second blanket cylinder 14 is contactable with the second plate cylinder 12. The impression cylinder 15 is contactable with the first and second blanket cylinders 13 and 14 in different positions. The machine further includes a paper feed cylinder 16 for transferring printing paper supplied from a paper magazine 27 to the impression cylinder 15, a paper discharge cylinder 17 with chains 19 wound thereon and on sprockets 18 for discharging printed paper from the impression cylinder 15 to a paper discharge station 28.

The impression cylinder 15 contactable by the first and second blanket cylinders 13 and 14 has half the diameter of the first and second plate cylinders 11 and 12 and the first and second blanket cylinders 13 and 14. Further, the impression cylinder 15 has a gripper, not shown, for holding and transporting the forward end of printing paper.

The paper feed cylinder 16 disposed adjacent the impression cylinder 15 has the same diameter as the impression cylinder 15. The paper feed cylinder 16 has a gripper, not shown, for holding and transporting the forward end of each sheet of printing paper fed from the paper magazine 27. When the printing paper is transferred from the feed cylinder 16 to the impression cylinder 15, the gripper of the impression cylinder 15 holds the forward end of the printing paper which has been held by the gripper of the feed cylinder 16.

The paper discharge cylinder 17 disposed adjacent the impression cylinder 15 has the same diameter as the impression cylinder 15. The discharge cylinder 17 has a pair of chains 19 wound around opposite ends thereof. The chains 19 are interconnected by coupling members, not shown, having grippers arranged thereon. When the impression cylinder 15 transfers the printing paper to the discharge cylinder 17, one of the grippers of the discharge cylinder 17 holds the forward end of the printing paper having been held by the gripper of the impression cylinder 15. With movement of the chains 19, the printing paper is discharged to the paper discharge station 28.

The impression cylinder 15 is connected to a drive motor 10 through a belt 22. The impression cylinder 15, feed cylinder 16, discharge cylinder 17 and first and second blanket cylinders 13 and 14 are connected to one another through gears attached to ends thereof, respectively. Further, the first blanket cylinder 13 is connected to the first plate cylinder 11, and the second blanket cylinder 14 to the second plate cylinder 12 by gears attached to ends thereof, respectively, when the first and second blanket cylinders 13 and 14 are in printing positions shown in solid lines in FIG. 1. Thus, the drive motor 10 rotates the feed cylinder 16, impression cylinder 15, discharge cylinder 17, first and second blanket cylinders 13 and 14 and first and second plate cylinders 11 and 12 synchronously with one another.

At platemaking time, the first and second blanket cylinders 13 and 14 are placed in platemaking positions shown in two-dot and chain lines in FIG. 1. In this state, the first and second plate cylinders 11 and 12 are rotatable by motors (not shown) different from the drive motor 10.

The first plate cylinder 11 has, arranged therearound, an ink feeder 20*a* for feeding black ink (K), for example, to a plate, an ink feeder 20*b* for feeding magenta ink (M) to a different plate, and dampening water feeders 21*a* and 21*b* for feeding dampening water to the plates. The second plate cylinder 12 has, arranged therearound, an ink feeder 20*c* for feeding cyan ink (C), for example, to a plate, an ink feeder 20*d* for feeding yellow ink (Y) to a different plate, and dampening water feeders 21*c* and 21*d* for feeding dampening water to the plates.

Figure 2A:
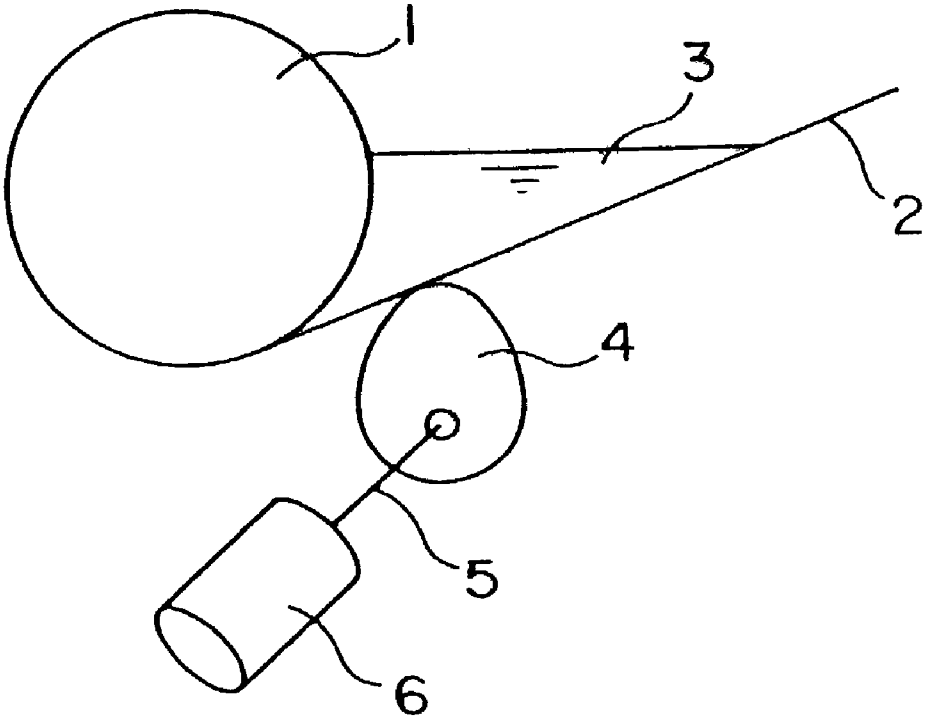
FIG. 2A is a schematic side view showing an ink source of an ink feeder.
Figure 2B:
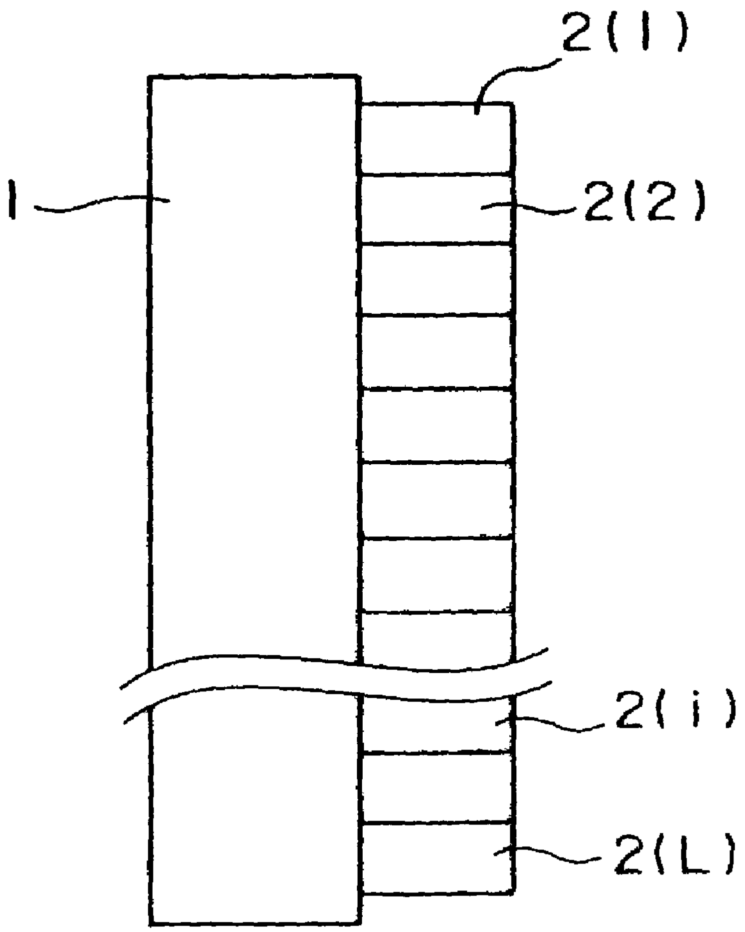
FIG. 2B is a plan view of the ink source.

FIG. 2 is a schematic view showing an ink source of each of the ink feeders 20*a*, 20*b*, 20*c* and 20*d* (which may be referred to collectively as "ink feeders 20"). FIG. 2A is a schematic side view showing the ink source. FIG. 2B is a plan view of the ink source. Ink 3 is omitted from FIG. 2B.

The ink source includes an ink fountain roller 1 having an axis thereof extending in a direction of width of prints (i.e. perpendicular to a printing direction of the printing machine), and ink keys 2 (1), 2 (2) . . . 2 (L) arranged in the direction of width of the prints. In this specification, these ink keys may be collectively called "ink keys 2". The ink keys 2 correspond in number to the number L of areas divided in the direction of width of the prints. Each of the ink keys 2 has an adjustable opening degree with respect to the outer periphery of the ink fountain roller 1. The ink fountain roller 1 and ink keys 2 define an ink well for storing ink 3.

Eccentric cams 4, L in number, are arranged under the respective ink keys 2 for pressing the ink keys 2 toward the surface of ink fountain roller 1 to vary the opening degree of each ink key 2 with respect to the ink fountain roller 1. The eccentric cams 4 are connected through shafts 5 to pulse motors 6, L in number, for rotating the eccentric cams 4, respectively. Each pulse motor 6, in response to an ink key drive pulse applied thereto, rotates the eccentric cam 4 about the shaft 5 to vary a pressure applied to the ink key 2. The opening degree of the ink key 2 with respect to the ink fountain roller 1 is thereby varied to vary the rate of ink fed to the printing plate.

Referring again to FIG. 1, the first and second plate cylinders 11 and 12 have, arranged therearound, a plate feeder 23 for feeding plates to the periphery of the first plate cylinder 11, a plate feeder 24 for feeding plates to the periphery of the second plate cylinder 12, an image recorder 25 for recording images on the plates mounted peripherally of the first plate cylinder 11, an image recorder 26 for recording images on the plates mounted peripherally of the second plate cylinder 12, and a plate discharger 29 common to the first and second plate cylinders 11 and 12.

In the printing machine having the above construction, a printing plate drawn from a supply cassette 31 in the plate feeder 23 is cut to a predetermined size by a cutter 32. A forward end of the printing plate cut into sheet form is guided by guide rollers and a guide member, and clamped by a clamping jaw on the first plate cylinder 11. Then, the first plate cylinder 11 is rotated whereby the printing plate is wound peripherally of the first plate cylinder 11. The rear end of the printing plate is clamped by a different clamping jaw. While, in this state, the first plate cylinder 11 is rotated at low speed, the image recorder 25 irradiates the surface of the plate mounted peripherally of the first plate cylinder 11 with a modulated laser beam for recording an image thereon.

Similarly, a printing plate drawn from a supply cassette 33 in the plate feeder 24 is cut to the predetermined size by a cutter 34. A forward end of the printing plate cut into sheet form is guided by guide rollers and a guide member, and clamped by a clamping jaw on the second plate cylinder 12. Then, the second plate cylinder 12 is rotated whereby the printing plate is wound peripherally of the second plate cylinder 12. The rear end of the printing plate is clamped by a different clamping jaw. While, in this state, the second plate cylinder 12 is rotated at low speed, the image recorder 26 irradiates the surface of the plate mounted peripherally of the second plate cylinder 12 with a modulated laser beam for recording an image thereon.

The first plate cylinder 11 holds two printing plates mounted peripherally thereof, one for printing in the black ink and the other in the magenta ink. These two printing plates are arranged in evenly separated positions, i.e. in positions separated from each other by 180 degrees. The image recorder 25 records images on these printing plates. Similarly, the second plate cylinder 12 holds two printing plates mounted peripherally thereof, one for printing in the cyan ink and the other in the yellow ink. These two printing plates also are arranged in evenly separated positions. The image recorder 26 records images on these printing plates to complete a platemaking process.

The platemaking process is followed by a printing process for printing the printing paper with the plates mounted on the first and second plate cylinders 11 and 12. The printing process is carried out as follows.

First, each dampening water feeder 21 and each ink feeder 20 are placed in contact with only a corresponding one of the plates mounted on the first and second plate cylinders 11 and 12. Consequently, dampening water and inks are fed to the plates from the corresponding water feeders 21 and ink feeders 20, respectively. The inks fed to the plates are transferred to the first and second blanket cylinders 13 and 14, respectively.

Then, the printing paper is fed to the paper feed cylinder 16. The printing paper is subsequently passed from the paper feed cylinder 16 to the impression cylinder 15. The impression cylinder 15 continues to rotate in this state. Since the impression cylinder 15 has half the diameter of the first and second plate cylinders 11 and 12 and the first and second blanket cylinders 13 and 14, the black and cyan inks are transferred to the printing paper wrapped around the impression cylinder 15 in its first rotation, and the magenta and yellow inks in its second rotation.

The forward end of the printing paper printed in the four colors is passed from the impression cylinder 15 to the paper discharge cylinder 17. This printing paper is transported by the pair of chains 19 to the paper discharge station 28 to be discharged therein.

Upon completion of the printing process, the plates used in the printing are discharged to the plate discharger 29. Then, the first and second blanket cylinders 13 and 14 are cleaned by a blanket cleaning unit, not shown, to complete the printing process.

The printing paper printed in the four colors has, printed along with image areas thereon, areas called control strips for use in measuring color density. This printing machine includes a color density measuring station 40 for measuring color densities of the control strips on the printing paper transported by the pair of chains 19 toward the paper discharge station 28.

Figure 3:
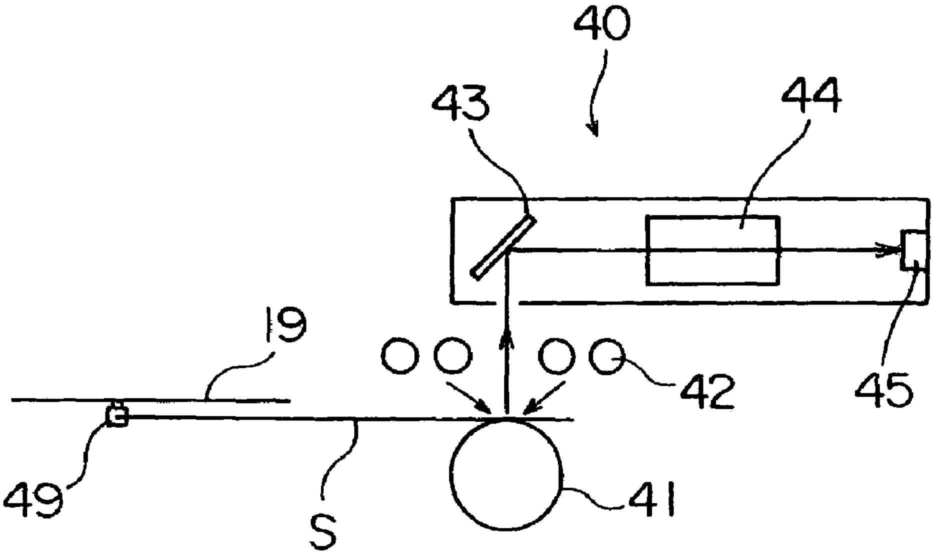
FIG. 3 is a schematic side view showing a color density measuring station along with chains.

FIG. 3 is a schematic side view of the color density measuring station 40 for measuring color densities of the control strips printed on the printing paper, which is shown with the chains 19.

The pair of chains 19 are endlessly wound around the paper discharge cylinder 17 and sprockets 18 shown in FIG. 1. As noted hereinbefore, the chains 19 are interconnected by coupling members, not shown, having a plurality of grippers 49 arranged thereon each for gripping a forward end of printing paper S transported.

The pair of chains 19 have a length corresponding to a multiple of the circumference of paper discharge cylinder 17. The grippers 49 are arranged on the chains 19 at intervals each corresponding to the circumference of paper discharge cylinder 17. Each gripper 49 is opened and closed by a cam mechanism, not shown, synchronously with the gripper on the paper discharge cylinder 17. Thus, each gripper 49 receives printing paper S from the paper discharge cylinder 17, transports the printing paper S with rotation of the chains 19, and discharges the paper S to the paper discharge station 28.

The printing paper S is transported with only the forward end thereof held by one of the grippers 49, the rear end of printing paper S not being fixed. Consequently, the printing paper S could flap during transport, which impairs an operation of the color density measuring station 40 to measure color densities of the control strips. To avoid such an inconvenience, this printing machine provides a suction roller 41 disposed upstream of the paper discharge station 28 for stabilizing the printing paper S transported.

The suction roller 41 is in the form of a hollow roller having a surface defining minute suction bores, with the hollow interior thereof connected to a vacuum pump not shown. The suction roller 41 is disposed to have an axis thereof extending parallel to the grippers 49 bridging the pair of chains 19, a top portion of the suction roller 41 being substantially at the same height as a lower run of the chains 19.

The suction roller 41 is driven to rotate or freely rotatable in a matching relationship with a moving speed of the grippers 49. Thus, the printing paper S is drawn to the surface of the suction roller 41, thereby being held against flapping when passing over the suction roller 41. In place of the suction roller 41, a suction plate may be used to suck the printing paper S two-dimensionally.

The color density measuring station 40 includes an illuminating unit 42 having a plurality of light sources for illuminating the printing paper S transported, and an image pickup unit having a mirror 43, a lens 44 and a CCD line sensor 45 for picking up images of the control strips on the printing paper S illuminated by the illuminating unit 42 and measuring color densities of the control strips. Light of the image reflected from the printing paper S over the suction roller 41 is deflected by the mirror 43, and passes through the lens 44 to be received by the CCD line sensor 45.

The CCD line sensor 45 provides measurements of the reflected light for computing color densities of the control strips. This color density information is displayed on a control panel 99 of the touch panel type shown in FIG. 1.

Figure 4:
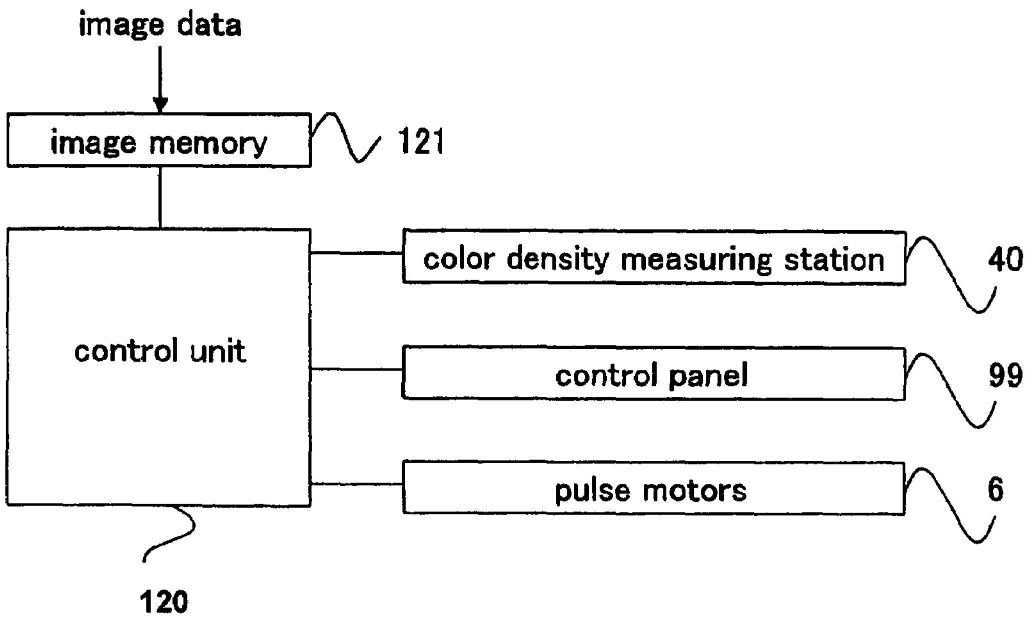
FIG. 4 is a block diagram of a principal electrical structure of the printing machine.

FIG. 4 is a block diagram showing a principal electrical structure of the above printing machine.

This printing machine includes a control unit 120 for controlling the apparatus as a whole. The control unit 120 is connected to the color density measuring station 40, the control panel 99, and the pulse motors 6 for varying the opening degrees of ink keys 2. The control unit 120 is connected also to an image memory 121. The image memory 121 serves to store image data of images being printed, which data is received from an RIP (Raster Image Processor) or the like. This image memory 121 also stores images of key control switches, described hereinafter, for varying the opening degrees of ink keys 2.

In the above printing machine, when manually adjusting the opening degrees of ink keys 2, the operator operates key control switches displayed on the control panel 99 and corresponding to the respective ink keys 2. At this time, an image of a print being processed is displayed on the control panel 99 along with the key control switches corresponding to the respective ink keys 2. This facilitates a correlation between the key control switches and the image of the print.

FIG. 5 shows explanatory views of a display screen 100 displayed on the control panel 99 of the touch panel type.

Figure 5A:
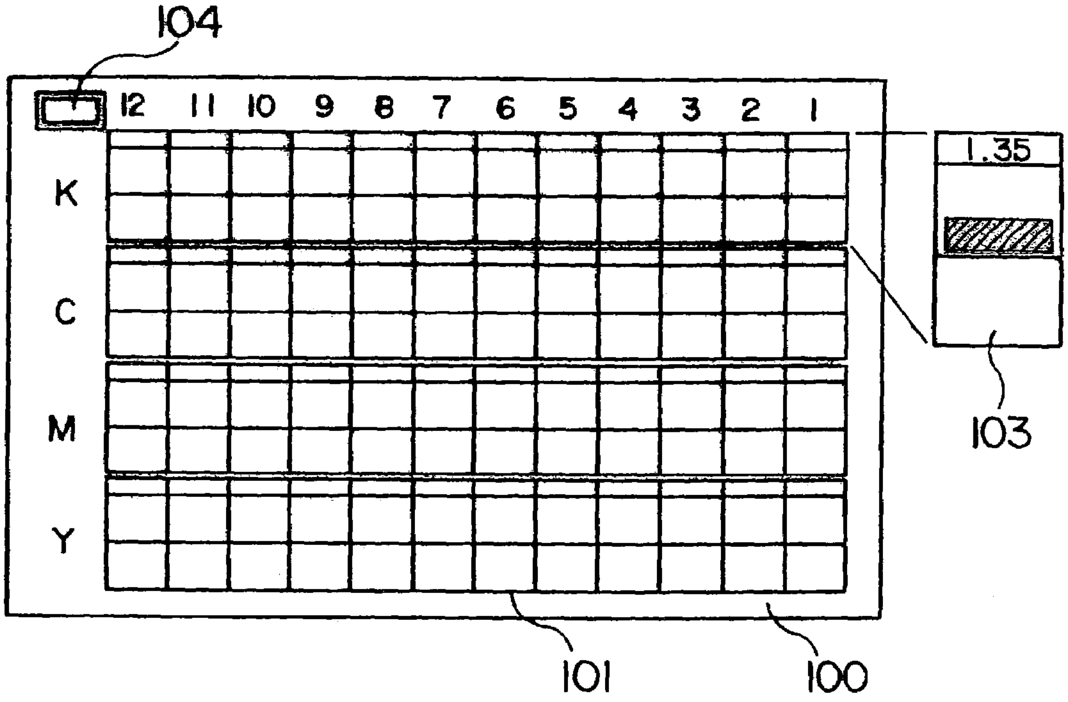
FIG. 5A is an explanatory view showing a display screen displayed on a control panel of the touch panel type.

In the state shown in FIG. 5A, the display screen 100 presents a key control switch 101 for adjusting the opening degrees of ink keys 2, and a display changeover switch 104. The key control switch 101 is a collection of key control switches 103 individually arranged in L (L=12 in FIG. 5A) areas corresponding to the ink keys 2, and for each of the ink colors (i.e. yellow, magenta, cyan and black). The individual key control switches 103 indicate the color densities of the control strips on the print measured by the color density measuring station 40 and the opening degrees of the ink keys 2.

Figure 5B:
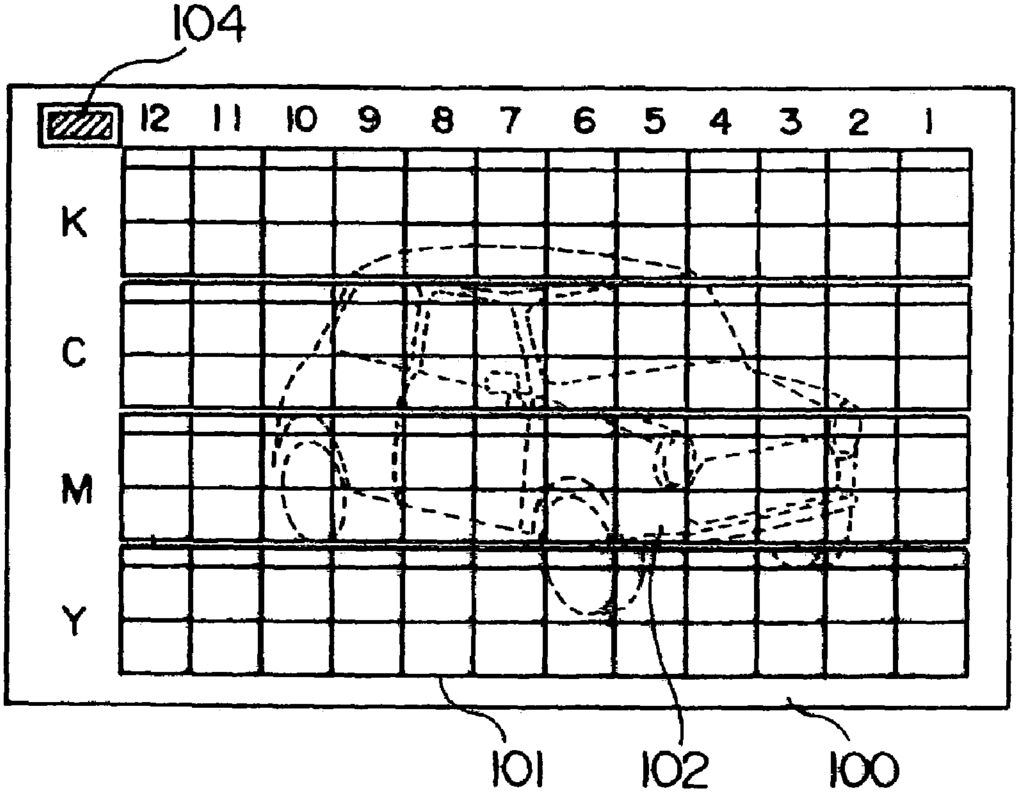
FIG. 5B is an explanatory view showing a display screen presenting key control switches and a printed image displayed in superimposition on the control panel of the touch panel type.

When the changeover switch 104 is operated in this state, as shown in FIG. 5B, the control panel 99 simultaneously displays the key control switch 101 which is a collection of key control switches 103 and an image 102 of a print being processed. More particularly, the key control switch 101 is transmitted through the image 102 of the print being processed, to be displayed as superimposed on the image 102 of the print.

Thus, when operating each key control switch 103 to adjust the opening degree of ink key 2, each key control switch 103 may easily be correlated to the image 102.

It is preferable that the density of the image, 102 displayed on the control panel 99 is selectively variable. The image 102 used may be obtained by appropriately reducing the resolution of image data actually used in platemaking. The image 102 may be an image of the image area on the printing paper read by the color density measuring station 40, or image data before being processed by an RIP.

The control panel 99 of the touch panel type may be a liquid crystal display, CRT display or various other display of the touch panel type.

This application claims priority benefit under 35 U.S.C. Section 119 of Japanese Patent Application No. 2002-191598 filed in the Japanese Patent Office on Jul. 1, 2002, the entire disclosure of which is incorporated herein by reference.

This invention may be embodied in other specific forms without departing from the spirit or essential attributes thereof and, accordingly, reference should be made to the appended claims, rather than to the foregoing specification, as indicating the scope of the invention.

The invention claimed is:

1. A printing machine, comprising:

a plate cylinder having a printing plate mounted on a periphery thereof;

an image recorder recording image data and performing platemaking on the printing plate by using the image data;

a plurality of ink keys installed in a row located axially to the plate cylinder;

a plurality of key control switches corresponding to the plurality of ink keys for adjusting opening degrees of the respective ink key;

a printing unit for printing a pattern of a print on printing paper to produce the print by transferring an ink fed to the printing plate onto the printing paper while transporting the printing paper in a predetermined printing direction, and discharging the produced print;

a color density measuring unit for measuring color density of the produced print discharged from the printing unit;

an ink key opening degree adjusting unit for controlling ink feeding rates by adjusting the opening degrees of each of the ink keys based on the color density of the produced print;

a touch sensitive control panel for adjusting the opening degrees of each of the respective ink keys; and a control unit for displaying images of the plurality of key control switches on the touch sensitive control panel, and superimposing an image of the pattern of the produced print on the images of the plurality of key control switches on the touch sensitive control panel by using the image data, wherein the printing unit produces a print by sequentially transferring inks of a plurality of colors to the printing paper, the plurality of key operation switches are a collection of key control switches individually arranged in each area of a plurality of areas corresponding to the ink keys, and for each of the ink colors, and the control unit displays images of the plurality of key control switches corresponding to the collection of key control switches are arranged two dimensionally, the images of the plurality of key control switches corresponding to the same ink key area are arranged in a first direction, and the images of the plurality of key control switches corresponding to the ink keys feeding the same ink are arranged in a second direction orthogonal to the first direction on the touch sensitive control panel.

2. A printing machine as defined in claim 1, wherein said key control switches are displayed as superimposed on the image of said print being processed, by transmitting said key control switches through the image of said print.

3. A printing machine for controlling ink feeding rates by adjusting opening degrees of a plurality of ink keys arranged in a direction perpendicular to a printing direction, based on color density of a print measured by a color density measuring unit, said printing machine comprising:

a touch sensitive control panel for adjusting the opening degrees of said ink keys;

an image memory for storing an image of said print being processed; and a control unit for displaying, in superimposition on said control panel, key control switches for adjusting the opening degrees of said ink keys, the color density of said print measured by said color density measuring unit, and the image of said print being processed.

4. A printing machine as defined in claim 3, wherein said key control switches and the color density of said print measured by said color density measuring unit are displayed as superimposed on the image of said print being processed, by transmitting said key control switches and said color density through the image of said print.

* * * * *